United States Patent [19]

Kitagawa

[11] Patent Number: 5,155,948

[45] Date of Patent: Oct. 20, 1992

[54] FISHING LURE

[75] Inventor: Yasuhiro Kitagawa, Takeo, Japan

[73] Assignee: Kabushiki Kaisha YO-ZURI, Takeo, Japan

[21] Appl. No.: 697,417

[22] Filed: May 9, 1991

[30] Foreign Application Priority Data

Sep. 12, 1990 [JP] Japan .................. 2-96327[U]

[51] Int. Cl.⁵ .............................................. A01K 85/00
[52] U.S. Cl. ................................. 43/42.36; 43/42.28
[58] Field of Search .............. 43/42.26, 42.27, 42.28, 43/42.29, 42.3, 42.36

[56] References Cited

U.S. PATENT DOCUMENTS

| | | | |
|---|---|---|---|
| 1,454,820 | 5/1923 | Readle | 43/42.28 |
| 1,905,567 | 4/1933 | Pflueger | 43/42.36 |
| 2,625,767 | 1/1953 | Pokras | 43/42.36 |
| 3,867,781 | 2/1975 | Wolfe | 43/42.36 |
| 4,619,067 | 10/1986 | West | 43/42.28 |
| 4,777,757 | 10/1988 | van Swinderen | 43/42.36 |
| 4,831,768 | 5/1989 | Sorace | . |
| 4,831,770 | 5/1989 | Dworski | 43/42.28 |

Primary Examiner—Kurt C. Rowan

[57] ABSTRACT

A fishing lure comprises: a head body; a socket adapted to be detachably attached to the head body; and a skirt section attached to the socket and having a multitude of rearwardly trailing strips. The head body and the socket are respectively equipped with a protrusion and a recess or vice versa, with the protrusion being adapted to be detachably fitted into the recess. The protrusion and the recess are respectively equipped with an engagement bulge and an engagement groove or vice versa, thereby enabling the socket to be attached and detached to and from the head body in an instant. The structure allows a plurality of sockets to be successively joined together in many stages, each of the sockets including a protrusion equipped with a bulge formed on the outer peripheral surface thereof and a recess equipped with a groove formed on the inner peripheral surface thereof, the bulge and the groove enabling each of the sockets to be detachably attached to another socket in an instant. Further, the color and the configuration of the strips of the skirt section attached to each of the sockets successively connected together may be made different from socket to socket.

11 Claims, 4 Drawing Sheets

FISHING LURE

BACKGROUND OF THE INVENTION

1. Field of the Invention

This invention relates to a fishing lure used for fishing and, in particular, to an improvement in a fishing lure of the type which comprises a head body and a socket having a skirt section consisting of an aggregate of strips and which is used, in particular, for trolling, etc.

2. Description of the Related Art

A prior art structure relevant to the present invention is disclosed, for example, in U.S. Pat. No. 4,831,768.

As shown in FIG. 5, the fishing lure of this prior art comprises: a head 112 having a plug 118; and a socket 134 including a shroud section 130 composed of a multitude of strips 132; the socket 134 being adapted to be detachably attached to the plug 118 of the head 112 by screwing.

A problem with the above conventional fishing lure is that the attachment of the socket to the head body is effected by screwing, i.e., the operation of screwing or unscrewing must be performed each time the socket is attached or detached, which is rather annoying.

Furthermore, this fishing lure has a serious problem that any rusting or damage of the screw sections makes it impossible for the screwing to be performed. Further, it should be noted that, since it is used seaside, a fishing lure is subject to corrosion, thus making the above problem even more serious.

Another problem in the prior-art fishing lure is that it only allows the attachment of one socket to one head. Accordingly, it is impossible to attach sockets in a number of stages, so that this structure does not allow an adjustment of the quantity of strips or a variation in the the coloring thereof.

SUMMARY OF THE INVENTION

This invention has been made in view of the above problems. It is accordingly an object of this invention to provide a fishing lure in which the attachment and detachment of the socket having a skirt section to and from the head can be performed in an instant, which is sufficiently corrosion-proof, and which allows the quantity of strips and the coloring thereof to be freely adjusted.

The present invention aims to solve the above-mentioned problems by a structure in which the head body and the socket with a strip section attached thereto can be linked with each other in an instant.

In a first aspect of this invention, there is provided a fishing lure comprising: a head body 2; a socket 5 adapted to be detachably attached to the head body 2; and a skirt section 3 attached to the socket 5 and having a multitude of rearwardly trailing strips 3a; the head body 2 being equipped with a protrusion 2b or a recess 12b, the socket 5 being equipped with a recess 6 or a protrusion 15a, the protrusion 2b and 15a being respectively adapted to be detachably fitted into the recesses 6 and 12b, wherein the protrusion 2b or the recess 12b of the head body 2, and the recess 6 or the protrusion 15a of the socket 5, are respectively equipped with an engagement bulge and an engagement groove, or vice versa, thereby enabling the head body 2 and the socket 5 to be attached and detached to and from each other in an instant.

In a second aspect of the present invention, the fishing lure constructed as described above further comprises one or more rear sockets 51 which are adapted to be successively joined with the above-mentioned socket 5, thereby enabling the socket 5 to extend in a plurality of stages.

In a third aspect of the present invention, the above-mentioned sockets 5 include a protrusion 5a equipped with a bulge 5d formed on the outer peripheral surface thereof, and each of the above-mentioned rear sockets 51 includes a recess 6 equipped with a groove 5c formed on the inner peripheral surface thereof, the bulge 5d and the groove 5c enabling each of the rear sockets 51 to be detachably attached to the socket 5 in an instant.

In a fourth aspect of this invention, the color or the configuration of the strips 4 of the skirt section 3 attached to each of the sockets 5 and 51 successively connected together is different from socket to socket.

Thus, in the fishing lure of this invention, the provision of the bulge 2c and the groove 5c enables the head body 2 and the skirt section 3 thereof to be attached and detached to and from each other in an instant. Accordingly, the attaching or detaching operation in the structure of this invention is much easier to perform than in the conventional structure of the screw type.

Accordingly, when the strips 3a of the skirt section 3 are broken or bitten off by a fish, the skirt section 3 can be replaced by a new one with ease.

The structure of the second aspect wherein sockets are connected together in many stages is advantageous in that a plurality of skirt sections 3 can belong to a single lure head, thus making it possible to augment the quantity of strips. Further, if the strips of some of the plurality of skirt sections 3 are broken or bitten off, the fishing lure can continue to function as such due to the presence of the remaining skirt sections.

Further, due to the structure wherein two consecutive sockets are detachably attached to each other by means of a bulge 5d and a groove 5c respectively provided in each of them, the sockets can not only be connected but mutually replaced with each other, thus enhancing the operational efficiency.

The color or the configuration of the skirt section 3 of each of the plurality of sockets can be made different from socket to socket, thereby enhancing the fish luring effect.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1A:
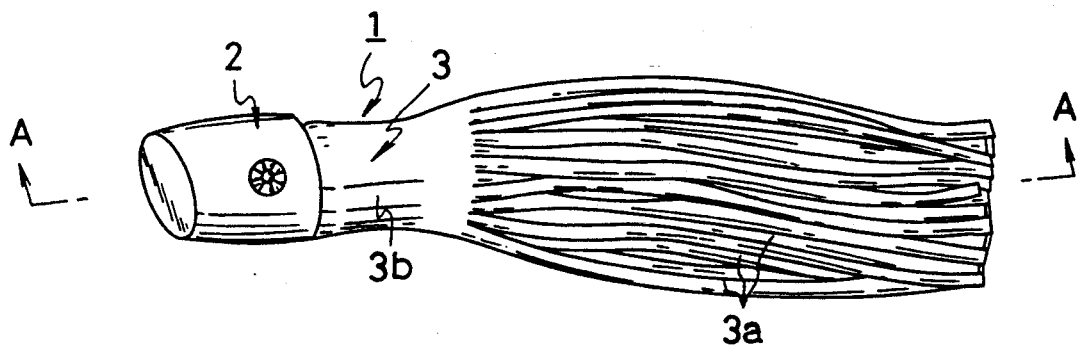
FIG. 1(a) is a perspective view showing an embodiment of this invention.

An embodiment of the present invention will now be described with reference to the accompanying drawings.

In FIGS. 3(a) and 3(b), the reference numeral 1 indicates a fishing lure, which is composed of a substantially cylindrical head body 2 and a socket 5 equipped with a skirt section 3.

The head body 2 is composed of a head section 2a and a socket-like protrusion 2b, which has a bulge 2c formed on the outer peripheral surface of its outer end portion.

Figure 1B:
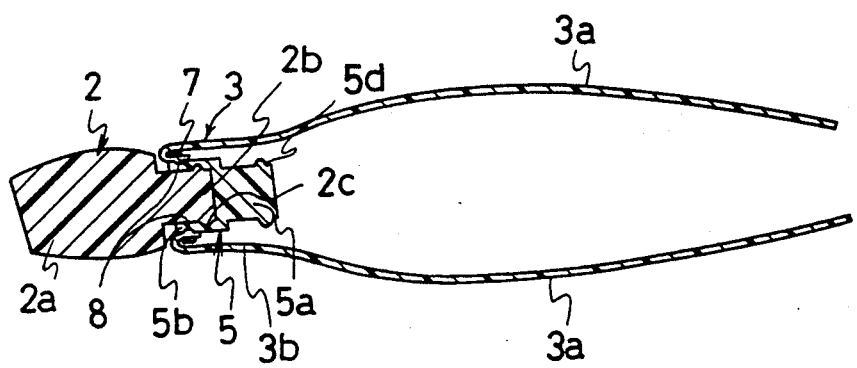
FIG. 1(b) is a sectional view taken along the line A—A of FIG. 1(a)
Figure 1C:
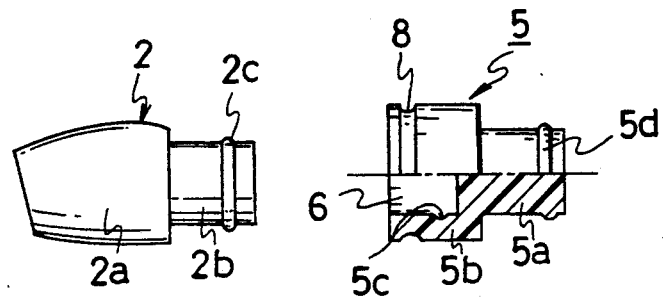
FIG. 1(c) shows the head body of this embodiment in a front elevation and the socket thereof in a partially cutaway view.

As shown in FIG. 1(c), the socket 5 includes a large-diameter section 5b equipped with a recess 6, into which the outer end portion of the protrusion 2b of the head body 2 is to be inserted. Formed on the inner peripheral surface of this recess 6 is a groove 5c, which is adapted to engage the bulge 2c of the protrusion 2b. Further, the socket 5 includes a cylindrical protrusion 5a extending from the large-diameter section 5b. This protrusion 5a has a bulge 5d formed on the outer peripheral surface of its outer end portion.

The skirt section 3 is composed of an aggregate of a multitude of flexible strips 3a and a shroud section 3b. The front end portion of the shroud section 3b is bent inwardly and permanently attached to a groove 8 formed on the outer peripheral surface of the large-diameter section 5b of the socket 5 by means of a binding cord 7. Thus, the skirt section 3 trails rearwards.

An example of the mode of use of this embodiment, constructed as described above, will now be described. When attaching, in the fishing lure of FIG. 1., the head body 2 to the socket 5, the protrusion 2b of the head body 2 is fitted into the recess 6 of the socket 5 so as to cause the bulge 2c on the outer peripheral surface of the protrusion 2b to engage the groove 5c on the inner peripheral surface of the recess 6, thus linking the head body 2 and the socket 5 with each other in an instant.

Furthermore, when thus connected together, these two members constitute an integral whole. Thus, due to the fish luring effect resulting from, for example, the seducing action obtained when the strips 3a of the skirt section receive a wave, fishing can be performed expediently.

Figure 2A:
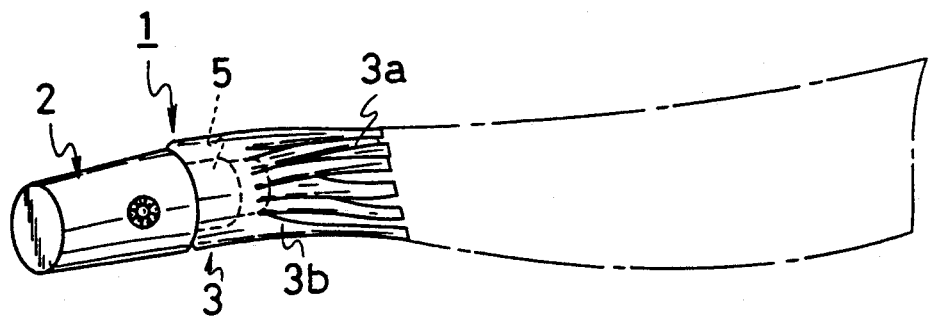
FIG. 2(a) is a perspective view showing this embodiment with its strips broken.
Figure 2B:
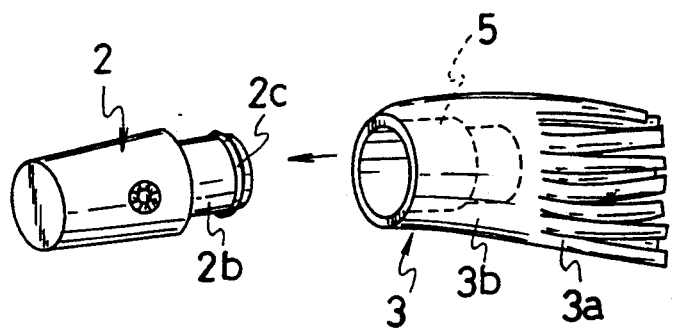
FIG. 2(b) is a perspective view showing the same with its skirt section removed.

If, in this fishing lure, the strips 3a are broken during use or bitten off by a fish, as shown in FIG. 2(a), the protrusion 2b of the head body 2 is drawn out of the recess 6 of the socket 5, as shown in FIG. 2(b). This operation causes the bulge 2c of the protrusion 2b to be disengaged from the groove 5c of the recess 6 in an instant.

Figure 2C:
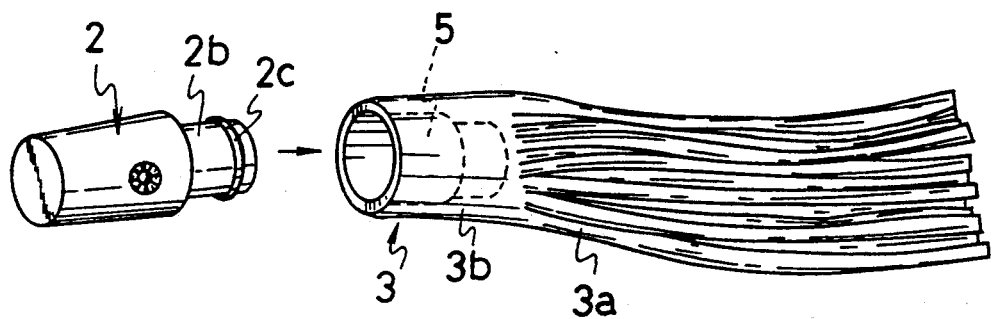
FIG. 2(c) is a perspective view showing the way a new skirt section is attached.

Subsequently, as shown in FIG. 2(c), a new socket 5 having a skirt section 3 is attached to the head body 2, thereby restoring the fishing lure 1 to the proper condition. Thus, the fishing can be resumed.

The head body 2 and the socket 5 are not connected together by screwing as in the prior art but snapped together by means of a bulge and a groove provided respectively in each of them, so that the replacement of the socket 5 can be performed with ease in an instant.

If not broken, the strips 3a may be required to be replaced depending, for example, on the marine weather condition or the liking of the fish to be lured. In such a case, a desired type of strips 3a can be attached with ease by replacing the socket 5 and, consequently, the skirt section 3.

Figure 3:
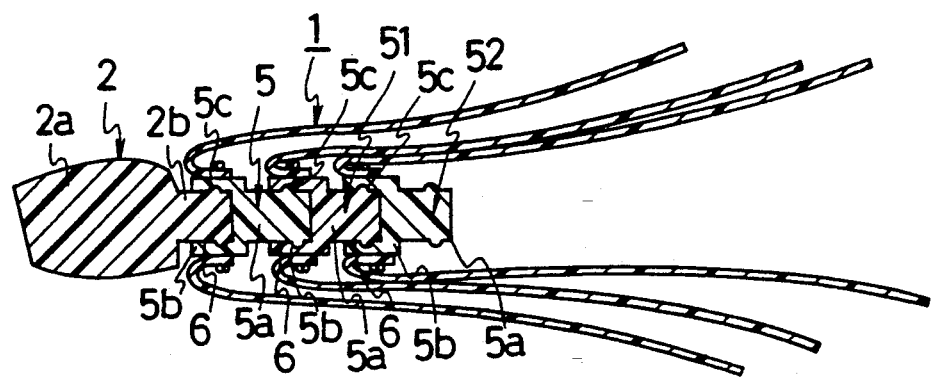
FIG. 3 is a sectional view showing the essential parts of another embodiment of this invention.

FIG. 3 shows a multi-stage fishing lure 1 in which a plurality of sockets 5 are joined with a single head body 2.

In the multi-stage fishing lure shown, sockets 5, and rear sockets 51 and 52 are connected with each other in three stages. The connection is effected as follows: The protrusion 5a of the socket 5 at the head is fitted into the recess 6 of the socket 51 in the middle, and the protrusion 5a of the socket 51 is fitted into the recess 6 of the socket 52 at the tail end.

In the above structure, the connection of two consecutive sockets is effected in an instant by causing the bulge 5d of the protrusion 5a of one socket to engage the groove 5c formed on the inner peripheral surface of the recess 6 of the other socket. Accordingly, the attachment or detachment of one socket to or from another can be effected very easily.

Since in this embodiment a plurality of sockets are attached to a single head body 2, the quantity of strips 3a can be markedly augmented as compared with that in conventional fishing lure structures. Furthermore, the color or the configuration of the strips 3a can be made different for different skirt sections. Thus, this embodiment can provide a multifunctional and versatile fishing lure.

With the above construction, a more effective seducing action can be obtained, thus enhancing the fish luring effect.

Further, the structure of the above embodiment is advantageous in that, if the strips 3a of one skirt section 3a are damaged, such a seducing action can be maintained by the presence of the strips 3a of the remaining skirt sections 3. Thus, this structure excels in durability.

In the above embodiment, the protrusion 2b is formed on the head body 2 and the recess 6 into which this protrusion 2b is to be fitted is formed on the socket 5. This, however, should not be construed as restrictive. The bulge and the groove may be arranged vice versa. In the structure shown in FIG. 4(a), a recess 12b is formed on a head body 12 whereas a protrusion 15a to be fitted into this recess 12b is formed on a socket 15.

Figure 4A:
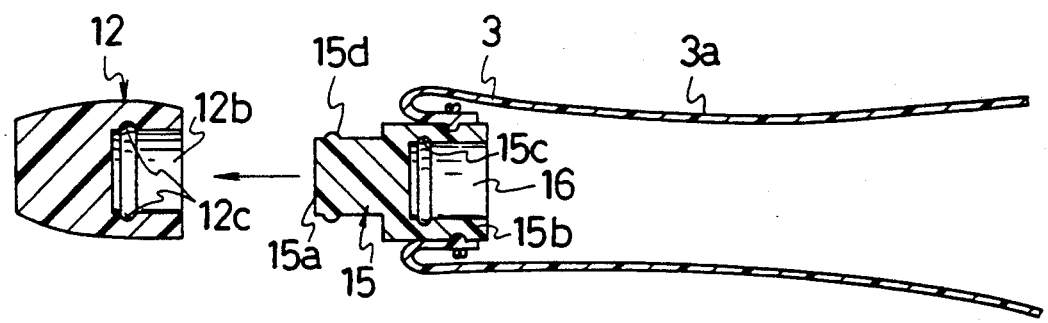
FIGS. 4(a) and 4(b) are sectional views showing still another embodiment of this invention.
Figure 4B:
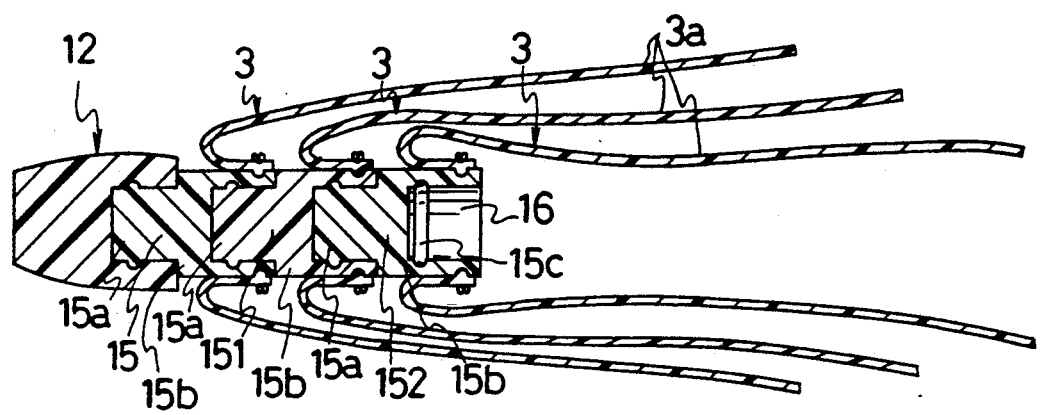
Figure 5:
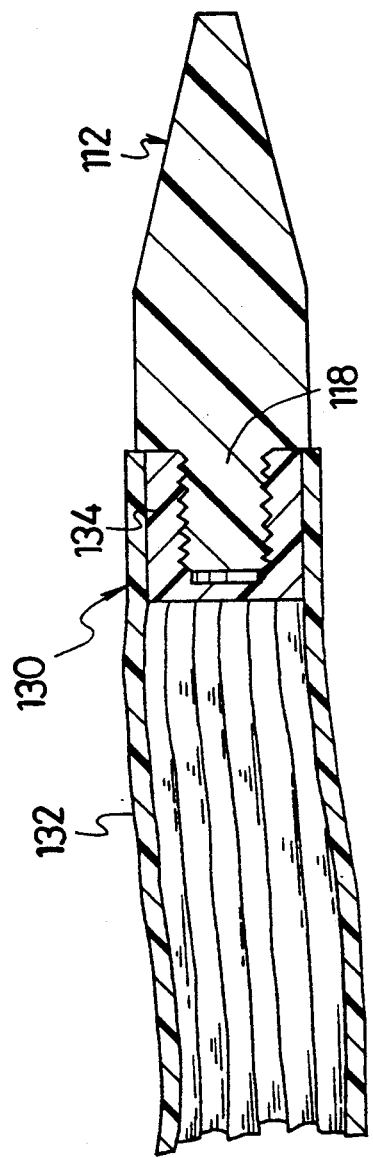
FIG. 5 is a sectional view showing a conventional fishing lure.

In the case of the embodiment shown in FIG. 4(a), the direction of the sockets 15 when they are connected with each other in many stages is reverse to that of FIG. 3. That is, the protrusion of each socket 15 is fitted into the recess of the socket directly in front of it, as shown in FIG. 4(b).

Further, while in the above-described embodiments the bulge 2c is formed on the protrusion 2b and the groove 5c is formed in the recess 6, this should not be construed as restrictive. Their arrangement may be vice versa. That is, the groove may be formed on the outer peripheral surface of the protrusion 2b, with the bulge being formed on the inner peripheral surface of the recess 6. Further, the configurations of the bulge and the groove are not restricted to those of the above embodiments. They can be modified arbitrarily. All that is required is that they enable the socket to be attached or detached to or from the head body in an instant.

Further, the configuration of the head body 2 is not limited to that of the above embodiments, either. For example, it may be formed after a fish head.

The means for attaching the shroud section 3b of the skirt section to the socket 5 is not limited to the binding cord 7 of the above embodiments. The attachment may be effected by an adhesive.

While in the above embodiments three sockets 5 are connected together, the number of sockets is not limited to that. It may be any number not less than 2.

Further, while in the above embodiments the connection of two consecutive sockets is effected by means of a bulge and a groove, this should not be construed as restrictive. It is also possible to effect the connection by, for example, screwing.

While in the above embodiments the head body and the sockets 5 are made of synthetic resin, the material for these components are not limited to that.

As described above, the structure of this invention is free from all the operational inconveniences resulting from the conventional structure wherein the head body and the socket are connected together by screwing. Thus, the structure of the present invention allows the operation of attaching or detaching the socket to be performed in a very expedient manner.

Due to the engagement structure consisting of a bulge and a groove, this invention enables the operation of attaching or detaching the socket to or from the head body to be performed in an instant, thus substantially enhancing the operational efficiency.

Since there is no need to form threaded portions as in the prior art, the structure of this invention is relatively simple, which means it allows mass production.

Further, due to the multi-stage structure wherein a plurality of sockets can be successively connected together, a plurality of skirts can be attached to a single head body, thereby making it possible to markedly augment the quantity of strips. In addition, the color and the configuration of the strips can be made different for different skirt sections. Thus, this invention can provide a fishing lure which is multifunctional and versatile in terms of fish seducing performance. Accordingly, the fish luring effect of the fishing lure of this invention is substantially improved as compared with that of conventional fishing lures.

In particular, due to the multi-stage structure wherein a plurality of sockets can be successively connected together, a plurality of skirt sections can be attached to a single head body, a condition which leads to the unique and exceptional advantage of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fishing lure comprising:
    a head body, the head body being a single, one-piece, unitary body;
    a socket detachably attached to said head body, at least one of said head body and said socket having a protrusion and the other of said head body and socket having a recess, the protrusion being detachably fitted into said recess in order to attach the socket to the head body, at least one of said protrusion and said recess having an engagement bulge and the other of said protrusion and recess having an engagement groove whereby the socket can be instantly attached to and detached from the head body, assembly of the head body being avoided because the head body is a single, one-piece, unitary body;
    a skirt section attached to said socket and having a multitude of rearwardly trailing strips;
    at least one rear socket which can be joined with said socket, thereby enabling said socket to extend in stages with the at least one rear socket being attached thereto; and
    attachment means for connecting the socket with the at least one rear socket, the attachment means comprising a protrusion and a recess formed on each of said socket and said at least one rear socket, the protrusions being formed on an outer peripheral surface thereof and the recesses being formed on an inner peripheral surface thereof, said protrusions and recesses enabling the at least one rear socket to be detachably attached to the socket in an instant by snap fitting one of the protrusions into one of the recesses.

2. The fishing lure as claimed in claim 1, wherein the at least one rear socket further comprises a plurality of rear sockets which are adapted to be successively joined with said socket, thereby enabling said socket to extend in a plurality of stages.

3. The fishing lure as claimed in claim 2, wherein each of said socket and said plurality of rear sockets includes: the protrusion having a bulge formed on the outer peripheral surface thereof; and the recess having a groove formed on the inner peripheral surface thereof; said bulge and said groove enabling each of said rear sockets to be detachably attached in an instant to said socket or that rear socket which is directly in front thereof.

4. The fishing lure as claimed in claim 3, wherein at least one of color and configuration of the strips of said skirt section attached to said socket and each of said rear sockets successively connected together are different from socket to socket.

5. The fishing lure as claimed in claim 1, wherein the head body is provided with the protrusion and the socket is provided with the recess.

6. The fishing lure as claimed in claim 5, wherein the protrusion on the head body has the engagement bulge and the recess on the socket has the engagement groove.

7. The fishing lure as claimed in claim 5, wherein the protrusion on the head body had the engagement groove and the recess on the socket has the engagement bulge.

8. The fishing lure as claimed in claim 1, wherein the head body is provided with the recess and the socket is provided with the protrusion.

9. The fishing lure as claimed in claim 8, wherein the recess on the head body has the engagement bulge and the protrusion on the socket has the engagement groove.

10. The fishing lure as claimed in claim 8, wherein the recess on the head body had the engagement groove and the protrusion on the socket has the engagement bulge.

11. The fishing lure as claimed in claim 1, further comprising a binding cord surrounding the socket, the skirt section being positioned between the binding cord and the socket whereby the binding cord attaches the skirt section to the socket.

* * * * *